A. WOLFF.
AGRICULTURAL MACHINE.
APPLICATION FILED NOV. 7, 1919.
1,402,822.
Patented Jan. 10, 1922.
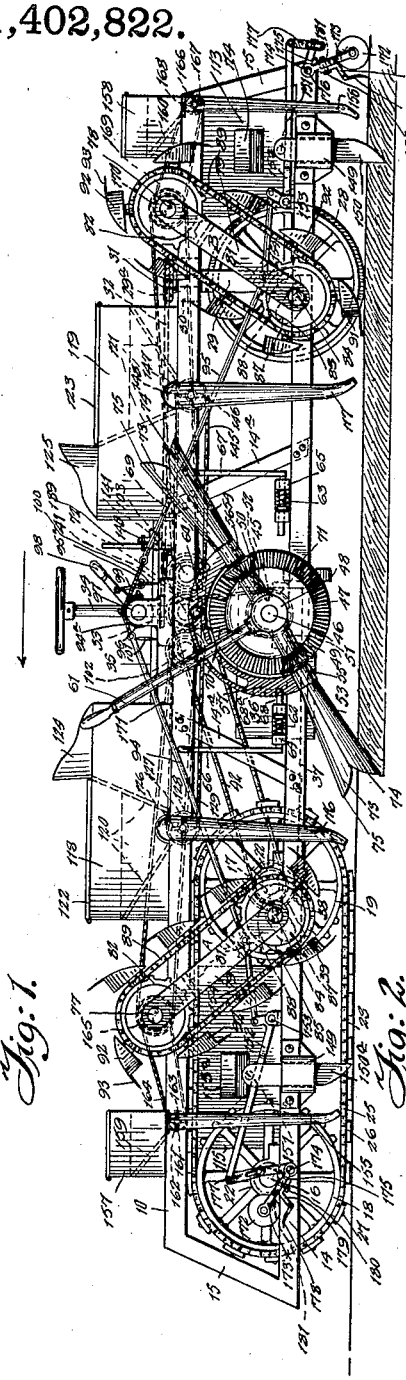
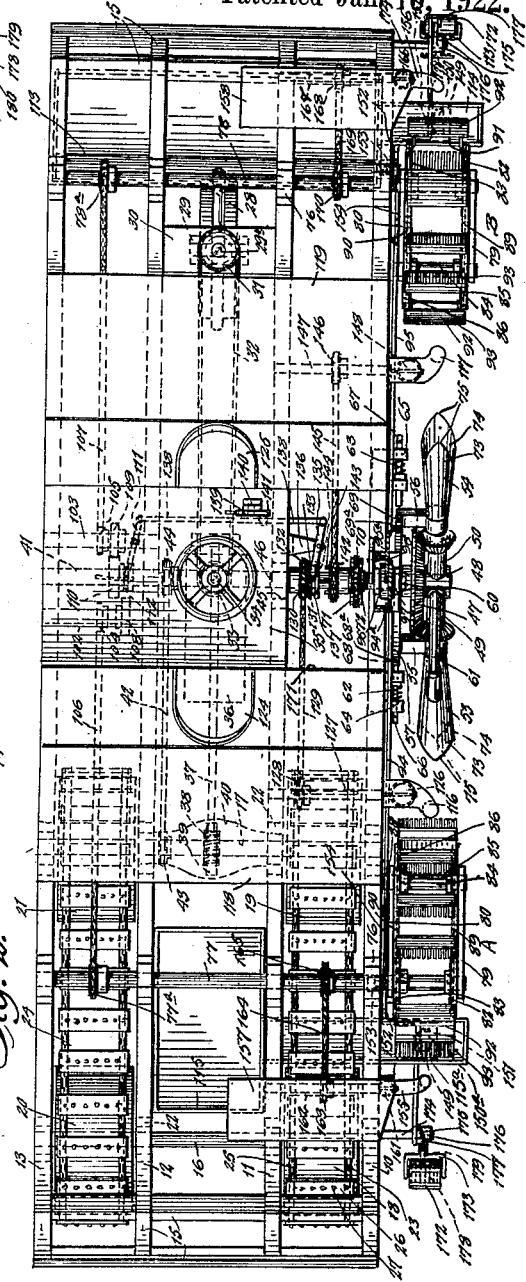
Inventor
August Wolff
By his Attorney C. P. Goepel

UNITED STATES PATENT OFFICE.

AUGUST WOLFF, OF NEW YORK, N. Y.

AGRICULTURAL MACHINE.

1,402,822.                Specification of Letters Patent.      Patented Jan. 10, 1922.

Application filed November 7, 1919. Serial No. 336,254.

*To all whom it may concern:*

Be it known that I, AUGUST WOLFF, a citizen of the United States, and a resident of the borough of the Bronx, county of the Bronx, city and State of New York, have invented certain new and useful Improvements in Agricultural Machines, of which the following is a specification.

This invention relates to improvements in agricultural machines, and has for an object to provide a machine adapted to carry out at one time, or as separate operations if desired, the various ground working processes of plowing, fertilizing, raking, harrowing, and planting, to the end that the farmer will not require more than the one machine, and the preparation of the ground for producing vegetation will be greatly simplified, and may be carried out with the least consummation of time and labor. The further objects are to provide a machine which may be operated in either direction to perform similar operations, so that it may be run back and forth over the ground without necessitating turning.

With these and other objects in view, an embodiment of my invention is shown in the accompanying drawing, and this embodiment will be hereinafter more fully described with reference thereto, and the invention will be finally pointed out in the claims.

In the accompanying drawings, Fig. 1 is a side elevation of the present embodiment of my improved agricultural machine. Fig. 2 is a plan view thereof. Similar reference characters indicate corresponding parts throughout the several figures of the drawings.

Referring to the drawings, the embodiment of my invention shown therein, comprises a frame preferably of structural steel, and consisting of parallel longitudinal upper beams 10 and 11, 12 and 13, lower longitudinal beams 14, bracing beams 14ª, disposed between the upper beams 10 and 13 and the lower beams 14, and horizontal and upright beams 15 at the ends.

The shafts 16 and 17 of toothed wheels 18, 19, 20, and 21, are journaled transversely of the beams 14 at one end of the frame in bearings 22, endless traction belts 23 and 24 extending over the respective wheels 18, 19 and 20, 21. The traction belts comprise spaced pairs of parallel chains 25, extending over the toothed peripheries of the wheels, and connected by ground-engaging cross pieces 26, provided with suitable traction studs 27. At the other end of the frame there is provided a single guide wheel 28, journalled in a forked bracket 29, the upright shaft 29ª of which is rotatably mounted in a cross piece 30 of the frame, and is provided with a sprocket gear 31, connected by the sprocket chain 32 to a sprocket gear 33, provided on a steering post 34 mounted upon a central platform or floor 35, supported upon the frame.

The shaft 17 is driven from the motor 36. The shaft 37 of the motor is provided with a worm 38, engaging a worm gear 39 provided on the shaft 17 within the differential housing 40. The motor is mounted substantially centrally of the machine, and is of any desirable type, being provided with the usual control and reversing means (not shown).

A transverse drive shaft 41 is journalled in the beams 10, 11, 12, and 13, beneath the floor 35, and is driven from the shaft 17 by means of chain 42, extending over sprocket gears 43 and 44, provided respectively on the shafts 17 and 41. Beneath the shaft 41 there is journalled in bearings 45 upon the beams 14, a shaft 46, having one end projecting from the frame, and provided with a bevelled gear 47 keyed thereon, the shaft also having loosely mounted thereto a hub 48, provided with a pair of radially disposed tubular bearing portions 49 and 50, in which are mounted the shafts 51 and 52 of the plow blades 53 and 54, said shafts engaging the apertured ends of forwardly projecting arms 55 and 56, provided on an arcuate slotted plate 57, disposed circumferentially about the bevelled gear 47. The slot of the plate 57 engages a fixed pin 60, and a handle 61 extends upwardly from the hub 48 and by swinging this from one extreme position to the other, either of the plows may be engaged in the ground, depending upon the direction in which the machine is to travel. In either of the extreme positions, the positions of the plows are fixed by spring pressed bolts 62 and 63, slidably mounted in brackets 64 and 65, secured to the beam 14, and provided with upwardly extending handles 66 and 67 by means of which they may be retracted, the said bolts engaging sockets 68 and 69 in the periphery of the plate 57. Additional sockets 68ª and 69ª are provided in the plate 57 to enable the positioning of the plates at different degrees of elevation and inclination. The shaft 46 is driven from the shaft 41 by means of a chain 70 extending over sprocket gears 71 and 72 respectively provided on the said shafts, and thereby through the bevelled gear and pinions, the plows are rotated. By moving the handle 61 to an intermediate position, both plows will be raised from the ground, the bolts 62 and 63 entering beneath the ends of the plate 57 and supporting the plows in raised position.

The plows comprise two curved and flared blades 73 and 74 pointed at their ends as at 75, and arranged with their concave sides toward each other to form a tube. In operation the pointed ends cut into the ground with a scooping, drilling action, which effectually turns and breaks up the ground.

At each side of the plows and toward the ends of the frame, there are journalled in bearings 76 mounted upon the beams 10, 11, 12, and 13, transverse shafts 77 and 78, projecting beyond the frame at the plow side thereof, and supporting the raking apparatus A and B respectively. These raking apparati are similar in form, but opposed in relation, and are adapted to operate behind the plows, one being in operation, while the other is out of operation. They each comprise an inclined frame having a pair of parallel sides 79 and 80, connected by intermediate bracing pieces 81, the upwardly extending apertured ends engaging the respective shafts 77 and 78, sprocket gears 82 and 83 being secured to the said shafts within the frame, while the downwardly projecting apertured ends support a shaft 84, having sprocket gears 85 and 86 mounted thereon, and engaging at its inwardly projecting end the arcuate slot 87 of a plate 88 secured to the beam 14. Endless chains 89 and 90 extend over the sprocket gears and support a series of cross-bars 91 upon which are mounted conveyer buckets 92, provided at their open ends with projecting rake teeth 93, and adapted as they engage the ground to gather up rocks, brush, and the like, extending above the ground. The frames of the raking apparatus are connected by rods 94 and 95, provided at their ends with flexible portions 94ª and 95ª, to the periphery of a drum 96, mounted in a bracket 97 supported on the beam 10, the said drum being provided with a lever handle 98 by which it may be turned and through its connections with the raking apparatus, raise either of them, while the other is lowered, so that the apparatus to be operated is engaged with the ground, while the other is raised therefrom. The handle 98 is secured in position by means of a hook 99, engaging one or the other of two eyelets 100 and 101 provided on the base of the bracket 97. By moving the handle to an intermediate position, both of the raking apparatus will be raised from the ground.

The shafts 77 and 78 are individually driven from the drive shaft 41 by countershafts 102 and 103 journalled in the beams 12 and 13, and provided with sprocket gears 104 and 105 connected by chains 106 and 107 to sprocket gears 77ª and 78ª on the shafts 77 and 78. Gears 108 and 109 on the countershafts 101 and 102 are adapted to be individually meshed with a shifting gear 110, keyed to the shaft 41 and adapted to be shifted by means of a lever 111 pivotally mounted upon the under side of the floor 35 and engaging the annular groove 112 in the hub of the gear 110. As illustrated, the machine is arranged to move in the direction of the arrow, the raking apparatus B is lowered and driven, while the raking apparatus A is raised and stationary. The material picked up by the raking apparatus B is deposited in a receptacle 113 transversely supported upon the beams 14, the material first falling upon an inclined chute 114, which carries it to the receptacle, and similarly, the material picked up by the raking apparatus A is deposited in a receptacle 115, disposed longitudinally, however, between the beams 11 and 12, an inclined chute 115ª, carrying the material to the receptacle.

In front of each of the plows in their operative positions, there are disposed the ends of fertilizer distributing tubes 116 and 117 respectively, and adapted, as will presently appear, to deposit fertilizer upon the ground, which is thereupon mixed into the ground by the operation of the plows. The tubes are connected at their upper ends to outlets at the lower portions of the sides of fertilizer containers 118 and 119, having their bottoms 120 and 121 inclined to the said outlets, the upper sides of the said containers being provided with hinged covers 122 and 123, and also supporting the seats 124 and 125, upon either of which the driver may sit in a corresponding relation with the steering post, depending upon the direction of travel of the machine. Within the tube 116 there is provided a rotary feed wheel 126, adapted, as it is rotated, to gradually feed the fertilizer, and when stationary to stop its flow, its shaft 127 being journalled in the beams 10 and 11 and provided with a sprocket gear 128, connected by a chain 129 to a sprocket gear 130, loosely mounted on the shaft 41. Pins 131 are provided upon the face of the gear 130 adapted to engage sockets 132 in the side of a sliding clutch collar 133, keyed to the shaft 41 and adapted to be moved into and out of engagement with the gear 130 by means of a lever 135 pivotally mounted upon a bracket 136 and engaging an annular groove 137 in the clutch collar. The lever 135 is connected at its end to one end of a rod 138, said rod being connected at its other end to the end of the lever 111, said rod adapted to be shifted by means of a hand lever 139 pivotally mounted upon a bracket 140, and extending through a slot 141 in the floor 35, where it is connected at its lower end to the said rod. Thus, by operating the lever 139, both the clutch collar 133 and the shifting gear 110 may be shifted to cause the fertilizer distributing means in front of the plow and the raking apparatus rearwardly thereof to be simultaneously operated.

When the clutch collar 133 is shifted out of engagement with the gear 130, it is engaged with a sprocket gear 142 loosely mounted upon the shaft 41 and provided with pins 143, adapted to engage sockets 144 in the clutch collar. The gear 142 is connected by a chain 145 to a sprocket gear 146 mounted on the shaft 147 of the feeding wheel 148 disposed in the fertilizer distributing tube 117. The fertilizer tubes for the greater part of their length are disposed close to the frame to provide a free-way for swinging of the plows, while at their lower outlet ends, they are deflected outwardly into the path of the plows.

Disposed rearwardly of the raking apparatus, there are respectively provided in vertically slotted brackets 149 secured to the beam 14, knife members 150 and 150ª adapted in their lowered position to cut a groove or furrow in the ground for the reception of seed. The knife members are adapted to move vertically in the brackets, and at their upper ends are provided with a pin 151 engaged at its under side by the end of a crank lever 152, pivotally mounted in a bracket 153 supported upon the beam 14 and connected at its short arm by a rod 154 to the frame of the raking apparatus, so that as the raking apparatus is lowered the knife member is likewise lowered, while raising of the apparatus will cause the knife member to be raised out of the ground into inoperative position.

Rearwardly of the knife members there are disposed the outlet ends of seed distributing tubes 155 and 156 connected at their upper ends to the outlets of seed boxes 157 and 158 mounted upon the upper side of the frame, the bottoms 159 and 160 of the seed boxes being inclined toward the outlets. Within the tube 155 there is disposed a rotatable seed distributing wheel 161, its shaft 162 being journaled in the beams 10 and 11, and provided with a sprocket gear 163, connected by a chain 164 to a sprocket gear 165 provided on the shaft 77 of the raking apparatus A and by means of which it is rotated. Similarly a seed distributing wheel 166 is disposed in the tube 156 having its shaft 167 journaled in the beams 10 and 11, and provided with a sprocket gear 168 connected by a chain 169 to a sprocket gear 170 provided on the shaft 78 of the raking apparatus B.

Rearwardly of each of the seed distributing tubes there is provided a roller 172, its supporting arm 173 being pivotally mounted on a shaft 174 secured to the beam 14, a lever arm 175 being provided on the hub 176 of the arm 173 which is connected by a slotted link 177 to the end of the lever 152 so that when the lever is actuated, the roller will be raised or lowered into inoperative or operative positions. A rake 178 is provided in front of the roller, its arm 179 being adjustably connected to the arm 173 by means of a bolt 180 engaging a slot 181 in the arm 173. After the seeds are planted in the furrow made by the knife members 150 and 150ª, earth is covered over the seed by the rake and rolled by the roller. The slotted link 177 permits the roller to move up and down to a limited degree to follow the irregularities of the ground, without disturbing the lever 152.

In the illustration, the machine moving in the direction of the arrow, the plow 53, the fertilizer distributor 116, the raking apparatus B, the knife member 150, the seed distributor 156 and the rake and roller rearwardly of the seed distributor 156 are in operation, performing the successive functions of distributing fertilizer upon the ground, plowing and mixing the fertilizer into the ground, raking rocks, brush, and other débris projecting above the ground, cutting a furrow in the ground, for the reception of seed, and planting seed in the furrow. When the machine reaches the end of its travel in one direction, the same is shifted so that the plow will engage the unbroken ground contiguous to the previously broken ground, and the plow 54 is placed in operative position together with the fertilizer distributor 117, the raking apparatus B, the knife member 150ª, the seed distributing apparatus 155, and the rake and roller rearwardly of the seed distributor 155, whereupon by driving the machine in the reverse direction, these parts of the machine function in a similar manner to the corresponding parts above referred to. In either direction of movement of the machine, the driver may observe the action of the plow through the opening 171 in the frame at one side of the platform 35, so that he may accurately determine the direction to drive the machine. By disconnecting the driving chains of any of the various implements, namely, the plows, fertilizer distributor means, raking apparatus, the knife means for cutting a seed receiving furrow, and the seed distributing means, one or more of the implements may be made operative or inoperative, so that the machine may be operated as a plow only, or as a raking apparatus, or in any desired combination, depending upon the particular requirements. The machine, it will be understood, may be used for excavating, trench-digging and the like.

I have illustrated and described a preferred and satisfactory embodiment of my invention, but it is obvious that changes may be made therein within the spirit and scope thereof, as defined in the appended claims.

I claim:

1. In an agricultural apparatus, a frame, propulsion means therefor, a plow having a pair of transversely curved and flared blades arranged with their concave sides toward each other and adapted to have rotary movement, said plow also adapted to be adjusted into fixed relation to the frame and extend in the direction of progressive movement thereof, whereby said curved and flared blades are adapted to effect a scooping and drilling action for turning and breaking up the ground.

2. In an agricultural apparatus, a frame adapted to travel over the ground, a two blade plow mounted on the frame and arranged to be secured in relation to the frame to extend in the direction of progressive movement thereof, said blades being transversely curved and flaring and disposed with their concave sides toward each other, and means for axially rotating the plow whereby to scoop and drill the ground for turning and breaking up the same.

3. In an agricultural apparatus, a frame, propulsion means therefor, a plow comprising a pair of opposed blades of curved cross section pointed at their ends, and forming a tube, said plow adapted to rotate about its longitudinal axis, and means for rotating said plow.

4. In an agricultural apparatus, a frame, propulsion means therefor, a plow comprising a pair of opposed blades of curved cross section and of gradually increasing width toward their ends and forming a flared tube, said plow adapted to rotate about its longitudinal axis, and means for rotating said plow.

5. In an agricultural apparatus, a frame adapted to be moved over the ground, a two-blade plow carried by the frame and having its blades transversely curved and arranged with their concave sides toward each other and pointed at their outer ends and flaring toward the same, means for adjustably fixing said plow in relation to the frame to extend in the direction of the progressive movement thereof, and means for axially turning said plow whereby to consecutively bring said pointed and curved ends of the blades into scooping and drilling contact with the ground and to turn over and break up the same.

6. In an agricultural apparatus, a frame, propulsion means therefor, adapted to propel said frame in forward and reverse directions, and reversible plow means carried by said frame and adapted to move in either direction of travel of said frame and adjust said plow to extend in the direction of progressive movement of the frame.

7. In an agricultural machine, a frame, propulsion means therefor, adapted to propel said machine in forward and reverse directions, a pair of plow means disposed in opposed relation and adapted to be individually engaged with the ground to operate in either direction of travel of the machine.

8. In an agricultural machine, a frame, propulsion means therefor, adapted to propel said machine in forward and reverse directions, a transverse shaft journaled in said frame, a pair of oblong rotary plow members disposed radially about said shaft and having swinging movement in the plane of rotation of said shaft to adjust one or the other of said members with fixed relation to the frame and thereby engage with the ground and extend in the direction of progressive movement of the frame, and means adapted to rotate said members about their longitudinal axes.

9. In an agricultural machine, a frame, propulsion means therefor, adapted to propel said machine in forward and reverse directions, a transverse shaft journaled in said frame, a pair of oblong rotary plow members disposed radially about said shaft and having swinging movement in the plane of rotation of said shaft adjustably secured to one or the other of said members to extend in the direction of movement of the frame and engage with the ground, means for rotating said transverse shaft, a gear on said shaft, and gears carried by said plow members meshing with said gear at said shaft, and adapted thereby to rotate said members.

10. In an agricultural machine, a frame, propulsion means therefor, adapted to propel said machine in forward and reverse directions, a transverse shaft journaled in said frame, a pair of oblong rotary plow members disposed radially about said shaft and having swinging movement in the plane of rotation of said shaft adjustably secured to one or the other of said members to extend in the direction of movement of the frame and engage with the ground, means for rotating said transverse shaft, a bevelled gear on said shaft, and bevelled pinions carried by said plow members meshing with said bevelled gear and adapted thereby to rotate said members about their longitudinal axes.

11. In an agricultural apparatus, a frame adapted to travel over the ground, a tubular plow carried on the frame and having a flaring end with spaced points thereat, means for fixing the plow with relation to the frame to extend in the general direction of the progressive movement thereof, and means for axially rotating the plow whereby to effect drilling and scooping of the earth to effectively break up and turn over the same.

12. In an agricultural apparatus, a frame adapted to travel over the ground, a plow of tubular construction flaring toward its outer end and having opposed points at said end to provide spade like members, means for securing the plow relatively to the frame to extend in the general direction of the progressive movement of the frame, and means for axially rotating the plow whereby to successively bring said curved spade-like points of the plow into contact with the ground for drilling and scooping the same and effectively breaking up and turning over the ground.

In testimony that I claim the foregoing as my invention, I have signed my name hereunder.

AUGUST WOLFF.